US008056067B2

(12) United States Patent
Fulton et al.

(10) Patent No.: US 8,056,067 B2
(45) Date of Patent: Nov. 8, 2011

(54) METHOD, COMPUTER PROGRAM PRODUCT, AND DEVICE FOR REDUCING DELAYS IN DATA PROCESSING

(75) Inventors: Michael Fulton, Maple Ridge (CA); Allan Kielstra, Ajax (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 1440 days.

(21) Appl. No.: 11/536,837

(22) Filed: Sep. 29, 2006

(65) Prior Publication Data

US 2008/0098376 A1   Apr. 24, 2008

(51) Int. Cl.
*G06F 9/45* (2006.01)
(52) U.S. Cl. ......... 717/158; 717/151; 717/154; 717/159
(58) Field of Classification Search .................. None
See application file for complete search history.

(56) References Cited

U.S. PATENT DOCUMENTS

| 6,090,156 | A | 7/2000 | MacLeod | |
|---|---|---|---|---|
| 6,671,794 | B1 | 12/2003 | Giamei et al. | |
| 7,051,186 | B2 | 5/2006 | Asaad et al. | |
| 7,840,954 | B2* | 11/2010 | Gschwind | 717/159 |
| 2003/0065888 | A1* | 4/2003 | Nishiyama | 711/137 |
| 2003/0140337 | A1* | 7/2003 | Aubury | 717/158 |
| 2004/0054990 | A1* | 3/2004 | Liao et al. | 717/124 |
| 2004/0210885 | A1* | 10/2004 | Wang et al. | 717/158 |
| 2005/0166195 | A1* | 7/2005 | Kawahito | 717/154 |
| 2005/0283774 | A1* | 12/2005 | Eichenberger et al. | 717/151 |
| 2005/0289529 | A1* | 12/2005 | Almog et al. | 717/158 |
| 2007/0226723 | A1* | 9/2007 | Eichenberger et al. | 717/159 |
| 2008/0098376 | A1* | 4/2008 | Fulton et al. | 717/151 |
| 2008/0109796 | A1* | 5/2008 | Kosche | 717/158 |
| 2008/0127148 | A1* | 5/2008 | Moudgill et al. | 717/154 |

OTHER PUBLICATIONS

"Architecture-aware classical Taylor shift by 1", Johnson et al., Jul. 2005, pp. 200-207, <http://delivery.acm.org/10.1145/1080000/1073913/p200-johnson.pdf>.*
"Equivalence verification of arithmetic datapaths with multiple word-length operands", Shekhar et al., Mar. 2006, pp. 824-829, <http://delivery.acm.org/10.1145/1140000/1131714/p824-shekhar.pdf>.*

* cited by examiner

*Primary Examiner* — Thuy Dao
(74) *Attorney, Agent, or Firm* — Cantor Colburn LLP; William A. Kinnaman, Jr.

(57) ABSTRACT

Data processing delay is reduced during data processing, using compiler optimization. Blocks of code are scanned in an order from blocks recurring most often to blocks recurring least often. In an order from blocks recurring most often to block recurring least often, shifts are inserted before arithmetic references, such that a previous use of the arithmetic reference does not require a shift, shifts are inserted after each memory use such that the next use of the memory does not require a shift, and shifts are inserted after each arithmetic reference such that the next use of the arithmetic reference requires no shift. In addition, if there is a mismatch between the last shifted amount of any one block and the required initial shifted amount in any of its successors, shifts are inserted to make up for the mismatch.

20 Claims, 3 Drawing Sheets

METHOD, COMPUTER PROGRAM PRODUCT, AND DEVICE FOR REDUCING DELAYS IN DATA PROCESSING

BACKGROUND

The present disclosure relates generally to data processing and, more particularly, to reduction of delays in data processing.

Mainframe computer systems, such as IBM's zSeries computing systems, have evolved into extremely useful systems, in large part because of their adaptability to changing needs of enterprises. These systems are typically "pipelined". That is, multiple instructions are being executed at different stages at the same time. Thus, once a first instruction is fetched and decoded, a second instruction is fetched and becomes part of the "pipeline". When the first decoded instruction proceeds to an address generation stage at which point operands are fetched, the second instruction is decoded, and a third instruction is fetched. Thus, multiple instructions may be active at various stages of the pipeline at any time.

Index registers are used for modifying operand addresses during the run of a program. An index register is a register used primarily for indexing into an array.

The flow of instructions into a pipeline may stall for many reasons. One such stall is referred to as "address generation interlock" (AGI). This occurs when one instruction updates a register being used by another register.

For example, if a first instruction modifies a register that a second instruction needs to calculate the address of operands, the second instruction may proceed to the address generation stage but end up being held until the first instruction updates the register that the second instruction needs. Only than may the second instruction complete its address generation and continue to progress in the pipeline.

AGI has become a problem for sophisticated computing systems, such as IBM's zSeries system. Attempts have been made at solving the problem of AGI, such as induction variable analysis, loop striding, unrolling and instruction scheduling. While all these attempts have been helpful, significant AGI delays are still present in today's highly optimized code.

On the current zSeries architecture, the C/C++ Specint and Java Specjvm98/Specjbb benchmarks spend a significant amount of time in address generation interlock (AGI) delays.

FIG. 1 illustrates an estimate of time spent in AGI delays for SpecInt benchmarks running on IBM's z990 system. As shown in the chart in FIG. 1, the AGI delays on highly optimized CPU intensive benchmarks range from 20% to over 40% of the processing time. Time spent on instruction performance and caching are also shown, for the purposes of comparison. These results were obtained through measurements of the IBM J9 Java Virtual Machine.

To understand the problem of AGI, it is useful to understand the structure of an array and how code is loaded from a register into an array. An array is formed of one or more memory units referred to as bytes. The "stride" of any array refers to the number of bytes between successive array elements.

To access an array, an index register needs to be shifted by some factor, (typically 1, 2, or 3 bits), to account for the offset in the array due to the stride of the array, i.e., the number of bytes in an array element. For example, for any array with a stride of 4 bytes, an index register needs to be shifted by 2.

As an example of code used for shifting an index register to access an array, consider the following zSeries code:

| SLL | Ri,2 |
| L | Ry, 0 (Ri,Rz) |

In this example, the index register Ri is shifted by 2 before a term is loaded from the register into the array. For details of zSeries code, the reader is directed to the zSeries Architecture Principles of Operation website, http://publibz.boulder.ibm.com/cgi-bin/bookmgr_OS390/BOOKS/DZ9ZR003/CCONTENTS?SHELF=EZ2ZO10E&DN=SA22-7832-03&DT=20040504121320/≧.

This shifting introduces a sizeable delay of the cycles on a modern processor, such as IBM's z990 processor. This problem is typically addressed in an optimizing compiler by "striding" the index register Ri, working with some multiple of Ri throughout the code instead of Ri to eliminate the need to shift. In the example above, Ri*4 would be used throughout the code instead of Ri, eliminating the shift. This cannot always be done, however, either because the underlying hardware does not have enough registers to prevent spilling of data into memory or because the striding optimization cannot be performed on a particular register.

Thus, there is a need for an improved technique for reducing delays in compiler optimization.

SUMMARY

According to exemplary embodiments, methods, computer program products, and systems are provided for reducing data processing delay during compiler optimization. Blocks of code are scanned in an order from blocks recurring most often to blocks recurring least often within the code. In order from blocks recurring most often to blocks recurring least often, shifts are inserted before arithmetic references, such that a previous use of the arithmetic reference does not require a shift, shifts are inserted after each memory use such that the next use of the memory does not require a shift, and shifts are inserted after each arithmetic reference such that the next use of the arithmetic reference requires no shift. In addition, a required shift amount for the first use of each arithmetic expression in each block is determined, and for each expression and each block, the last shifted amount of each block and the amount of shift needed before the block is entered is determined. The last shifted amount of each block is compared with the amount of shift needed before a successive block is entered to determine if there is a mismatch between the last shifted amount of any one block and the required initial shifted amount in any of its successors. If there is a mismatch, shifts are inserted to make up for the mismatch. The shifts may be inserted at the ends of basic blocks or along edges between blocks.

According to an exemplary embodiment, inserting shifts along edges between blocks includes identifying a set of expressions within the code, each expression including a simple, invertible arithmetic operation that is performed as part of an address computation. A backwards data flow analysis is performed through the code to determine where to move actual shifts to accommodate required shifts, and appropriate shifts are inserted in each expression to accommodate required shifts.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION

As mentioned above, on the current zSeries architecture, the C/C++ Specint and Java Specjvm98/Specjbb benchmarks spend a significant amount of time in address generation interlock (AGI) delays. An address generation interlock occurs when an instruction updates a register, and a subsequent instruction uses that register to form an address.

According to an exemplary embodiment, a technique is provided to reduce AGI delays in applications. The technique is applicable in any circumstance in which a single value, likely to be maintained in a machine register, is used directly and in a slightly modified form. The technique is particularly advantageous in reducing AGI delays that are inherent to the pipeline in hardware architectures. The technique may also be particularly useful in reducing AGI delays in zSeries applications.

According to exemplary embodiments, shift instructions are introduced to reduce AGI delays. It is important to note that the cost of adding shift instructions to generated code is significantly cheaper on zSeries hardware than incurring an AGI delay (a shift instruction is super-scalar and can be combined with up to two other instructions on a z990 processor, whereas an AGI delay includes a 3 cycle delay on a z990 processor). Shift instructions tend to stay relatively cheap with new hardware, whereas AGI delays can easily grow in size as pipelines get deeper. Thus, according to exemplary embodiments, shift instructions are introduced to reduce AGI delays that account for a significant proportion of path-length in, for example, current C/C++ and Java applications on zSeries systems.

Figure 1:
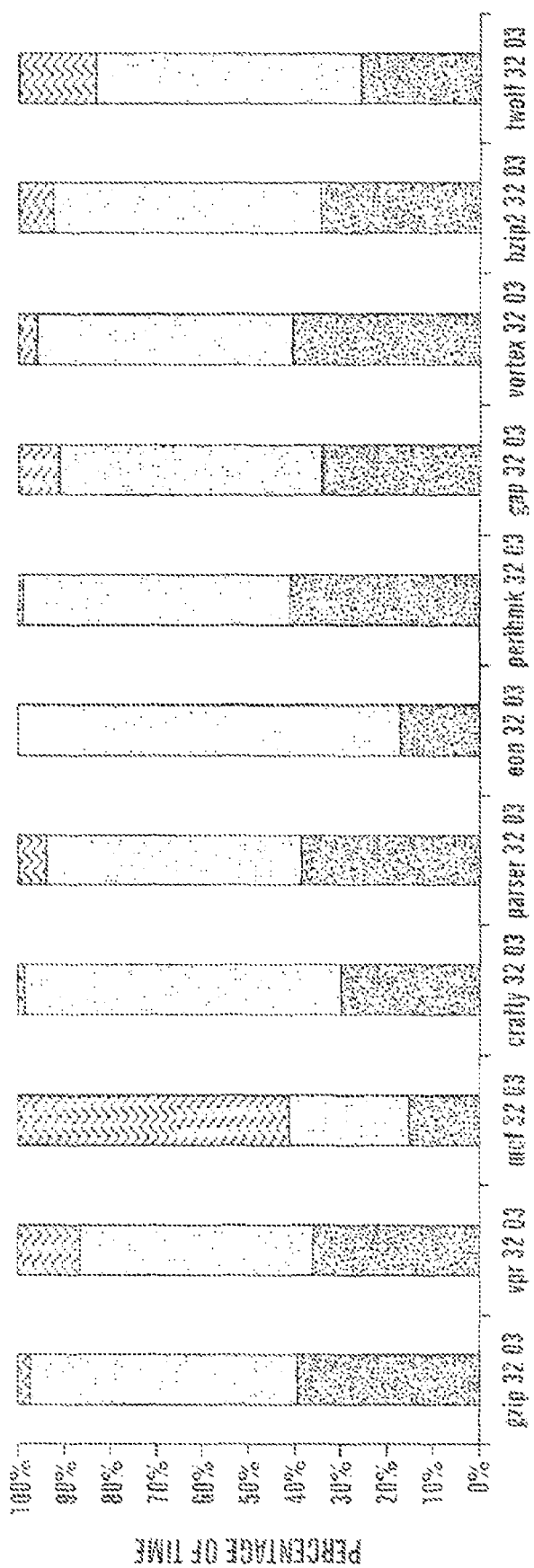
FIG. 1 illustrates AGI delay in traditional systems.
Figure 2:
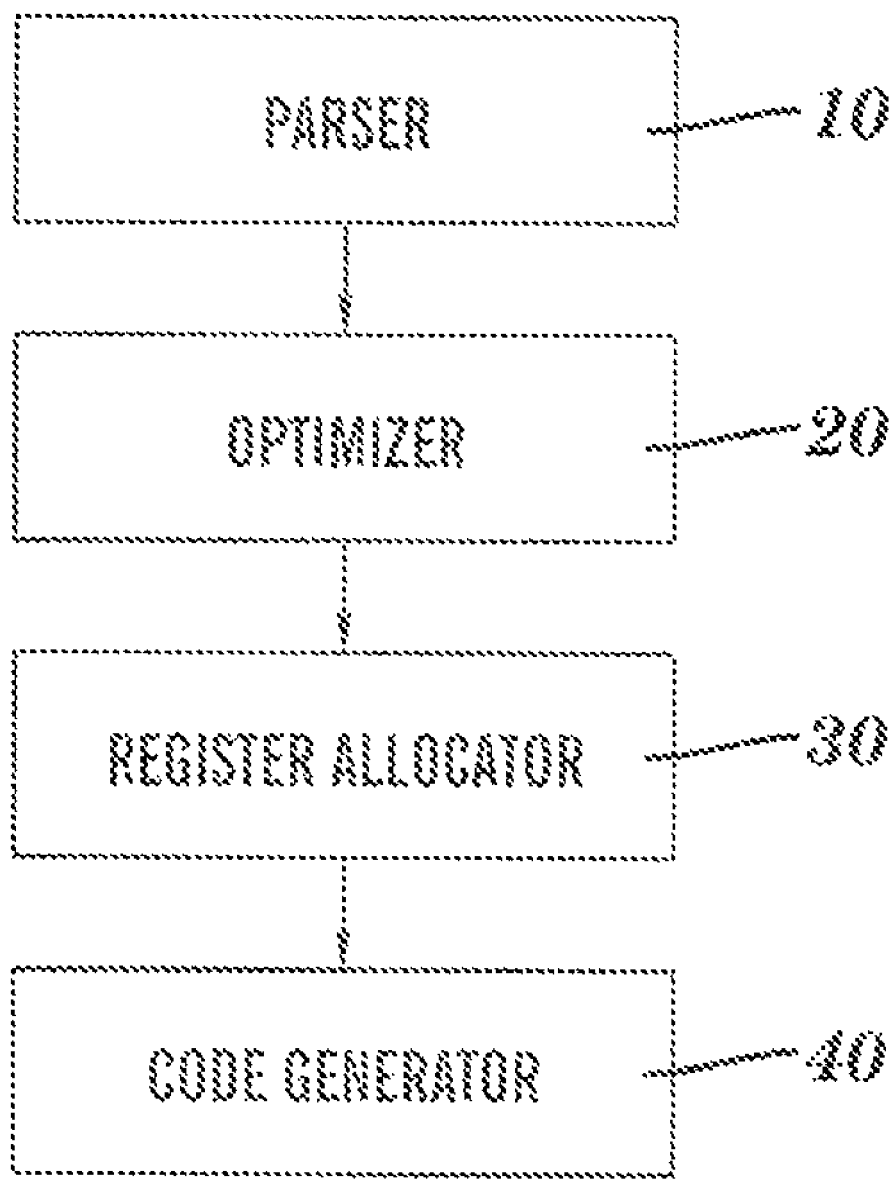
FIG. 2 illustrates a system in which data processing delay may be reduced according to exemplary embodiments.

FIG. 2 illustrates an exemplary system in which a technique for reducing delays may be used, according to an exemplary embodiment. In FIG. 2, a compiler is shown. The compiler comprises a program which reads statements, i.e., source code written in a human-readable programming language, such as C++, and translates them into a machine-readable-executable program. The compiler includes four main components: a parser 10, an optimizer 20, a register allocator 30, and a code generator 40.

The parser 10 translates the source code into an intermediate language (IL) which is understood by the compiler. The optimizer 20 performs various optimizing operations on the intermediate language to improve the execution performance of the compiled code. The register allocator 30 rewrites the symbolic registers generated in the intermediate language program to hardware registers defined on the target machine (computer). The code generator 40 translates the instruction in the intermediate language into executable instructions for the target machine and produces an executable program. According to an exemplary embodiment, the technique for reducing delay may be performed in the optimizer 20.

According to exemplary embodiments, techniques are provided for reducing AGI delays for cases where striding cannot be performed. Examples of applications of this technique are given below. To better understand the application of the techniques, however, it is useful to first consider a slightly larger example.

If the code has a strided value of a variable for addressing and a non-strided value for an arithmetic operation, it is important to keep the strided value of the variable active and derive the non-strided value as needed. The shifting of the strided value for subsequent arithmetic use will not create a delay and will therefore run faster. If instead, the non-strided value of the variable is active, and derivation of the strided value occurs when needed for addressability, a delay occurs due to shifting of the value.

Consider the following contrived loops of IBM's zSeries instructions. In a first example, register R2 is shifted by 3, and the value is put into R1 just before its use in a memory reference. In this "non-strided value active for loop" example, register R1 has the strided value of register R2 only for memory reference:

```
TopOfLoop:
    SLL   R1,R2,3      <-- assume too much register pressure to
keep R1,R2 for duration of the loop
    L     R4,20(R1,R3) <-- AGI is 3 cycles here from SLL on
previous instruction
    AR    R5,R4
    L     R6,40(R1,R3)
    AR    R5,R6
    MR    R5,R4
    AR    R5,R2
    AHI   R2,1
    CL    R2,40(,R8)
    BLR   TopOfLoop
```

As an alternative, register R1 could be shifted by 3, and the result could be put into register R2 and then used arithmetically. There would be no AGI delay in this sequence.

Now consider another loop in which the strided value is active. In a first example, register R2 has a non-strided value of register R1 only for arithmetic usage.

```
TopOfLoop:
    L     R4,20(R1,R3) <-- AGI is smaller on R1 - update is 2 cycles
before use so there is a 1 cycle delay
    AR    R5,R4
    L     R6,40(R1,R3)
    AR    R5,R6
    MR    R5,R4
    SRL   R2,R1,3      <-- too much register pressure to keep R1
and R2 for extended basic block
    AR    R5,R2
    AHI   R1,8         <-- R1 is changed arithmetically farther
from address usage.
    CL    R2,40(,R8)   -<-- operations on R1/R2 are arithmetic - no
delays
    BLR   TopOfLoop:
```

When memory references require both strided and non-strided values, it is best to create two shifts in the code, if the shifts are far enough away from the memory references. Accordingly, consider the following contrived loops.

In a first example of a two code shifts in non-strided value active for a loop, register R2 is shifted by 3.

```
TopOfLoop:
    SLL   R1,R2,3
    L     R4,20(R1,R3)  <-- Large AGI here
    AR    R5,R4
    L     R1,40(R1,R3)
    AR    R5,R1
    MR    R5,R4
    A     R5,120(R2,R3)
    AHI   R2,1
    CL    R2,40(,R6)
    BLR   TopOfLoop:
```

In a second example of two code shifts in a strided value active for a loop:

```
SLL    R1,R2,3
TopOfLoop:
    L     R4,20(R1,R3)  <-- No AGI on R1 - update to R1 is long
before next use
    AR    R5,R4
    L     R1,40(R1,R3)
    AHI   R1,8
    SRL   R2,R1,3
    AR    R5,R1
    MR    R5,R4
    A     R5,120(R2,R3)     <-- No AGI here from the SRL
because AR/MR has filled in the delay.
    CL    R2,40(,R6)
BLR   TopOfLoop:
```

There is some tension in the second example because the introduction of shifts could increase execution costs if there is not enough room in the extended basic block to eliminate the AGI delay. Similarly, enlarging the range of the non-strided value and strided value enough to eliminate the AGI may introduce spilling. In the case above, because a multi-cycle instruction is being performed (the multiplication MR), the Shift-Right (SRL) AGI on the corresponding Add (A) instruction could be hidden. If however, there had been no interleaving instructions between the two memory references, then the shift might cause a larger delay than is already present.

According to exemplary embodiments, a technique is provided that will have fewer address generation interlocks and thus less processing delay. This technique may be performed after striding on loops. Striding will create multiple induction variables, as appropriate, eliminating shifts that would otherwise create AGI delays. Striding may be effective, in combination with the technique described herein, as striding may eliminate the need for some shifting.

According to an exemplary embodiment, a technique is provided for reducing AGI by inserting shifts in blocks rather than introducing striding. As those skilled in the art will appreciate, a "block" refers to the longest set of instructions having one entry point, the blocks forming functions which in turn make up a program.

According to an exemplary embodiment, for a process containing a series of strided memory references and strided arithmetic references to a variable 'v' shifts may be inserted into blocks by scanning the blocks in the intermediate language code in an order from blocks recurring at a highest frequency to blocks recurring at the lowest frequency. For example, innermost nested blocks recur more often than unnested blocks. Thus, the nested blocks would be considered to recur at a higher frequency than unnested blocks. This ordered scanning of blocks may be referred to as "the block visit order".

According to an exemplary embodiment, walking the code in the block visit order, for each arithmetic reference within a block, a shift may be inserted immediately before the use of the arithmetic reference/operation, such that the previous use does not require a shift. Trivial shifts of zero need not be inserted. This may require the creation of temporary variables if an expression uses multiple strided versions of the variable. Temporary variables only exist for a short period of time. According to an exemplary embodiment, temporary variables may be manufactured by the compiler instead of being directly coded by the programmer. Consider the following contrived example:

```
x = i*8 + i*2;    // i*10 has been strength reduced to two shifts and
                  //an add is converted to:
i = i*8;
x = i;
i = i/4;
x += i;
```

According to an exemplary embodiment, no shifting happens on any arithmetic operation on 'v' where overflow could occur since it could alter the function of the program. For any load of variable 'v' or store of 'v', 'v' should be in a non-shifted state.

At this point, only some of the shifts required to make the program correct have been introduced. These shifts have no AGI delay associated with them since they feed a subsequent arithmetic reference.

Walking the code in the block visit order, shifts may be inserted immediately after each memory reference use such that the next use does not require a shift. This again may require the creation of temporary variables if multiple memory references occur in the same expression. At this point, all the shifts needed to make the program correct have still not been introduced, but again, these shifts have no delay associated with them since they occur after the memory reference, not before. This assumes there are not back-to-back memory references such that inserting a memory reference after the first memory reference creates an AGI delay on the next memory reference, e.g.,

```
L   Rx,20(Ri,Rb)
SRL Ri,3
L   Rx,40(Ri,Rb)         (AGI introduced from previous SRL)
```

Walking the code in the block visit order, shifts may be inserted immediately after each arithmetic reference such that the next use requires no shift. This does not apply to the last use of the reference in the block. Thus, the expression exits the basic block in some shifted state.

Although the paragraphs above make several references to "walking the code" to insert shifts before arithmetic references, insert shifts after memory references, and insert shifts after arithmetic references, it should be appreciated that all the shifts may be inserted based on one "walk of the code", i.e., the code does not need to be scanned multiple times to determine the order of blocks recurring most frequently to blocks recurring least frequently, as long as the appropriate shifts are inserted for all the blocks. The scanning of the blocks would need to be performed for each new compilation, however, because the frequency of recurrence of the blocks may change from compilation to compilation.

After the shifts are inserted, what remains is to ensure that there are no mismatches between the last shifted amount of any one block and the required initial shifted amount in any of its successors. Accordingly, walking the code in the block visit order, a determination is made as to what the required shift amount is for the first use of each arithmetic expression in the block. Then, for each arithmetic expression and each block, the last amount by which the value had been shifted and the amount by which the value must be shifted before the block is entered is determined. Ideally, the last shift amount of a block exactly matches the required initial amount for all of its successors and, similarly, all of a basic block's predecessors last shift amounts exactly match the block's required initial shift amount. Failing that, it may be necessary to insert shifts at the ends of some basic blocks or even along edges between basic blocks (a basic block meaning a series of instructions with one entry to the first instruction of the block and ending with a branch instruction.). It may in fact be useful to insert shifts at the ends of some blocks. This is the mechanism by which the length between the shift and the use of the shifted value is increased. It is rarely desirable to insert shifts along control flow edges.

Figure 3:
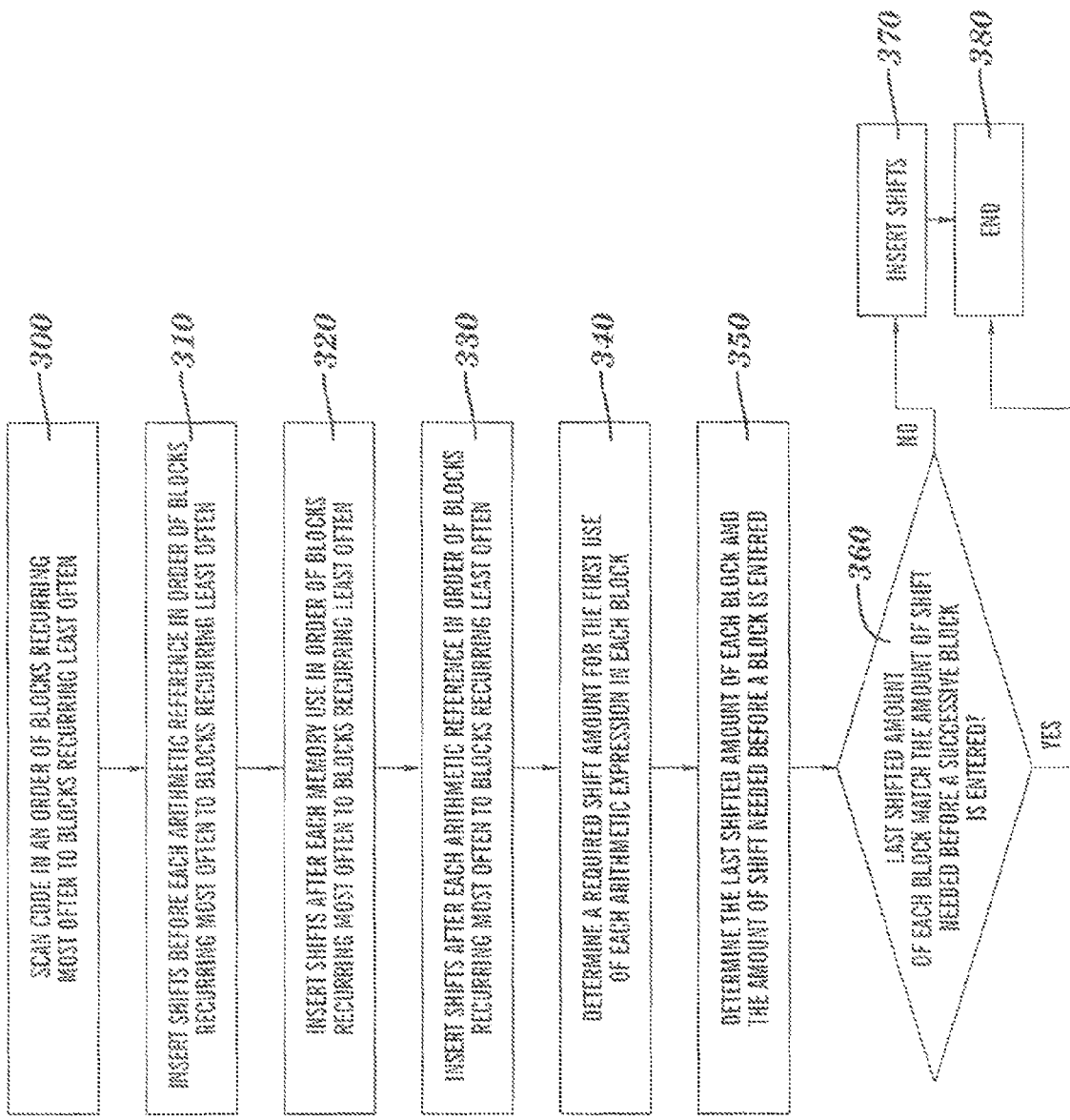
FIG. 3 illustrates a method for reducing data processing delay according to an exemplary embodiment.

FIG. 3 illustrates an exemplary method for reducing delays in compiler optimization according to an exemplary embodiment. The method begins at step 300 at which the blocks of code are scanned in an order from blocks recurring most often to blocks recurring least often. At step 310, shifts are inserted before arithmetic references, in order of blocks recurring most often to blocks recurring least often, such that a previous use of the arithmetic reference does not require a shift. At step 320, shifts are inserted after each memory use, in order of blocks recurring most often to blocks recurring least often, such that the next use of the memory does not require a shift. At step 330, shifts are inserted after each arithmetic reference, in order of blocks recurring most often to blocks recurring least often, such that the next use requires no shift. Next, a required shift amount is determined for the first use of each arithmetic expression in each block at step 340. Then, for each expression and each block, the last amount by which the value had been shifted and the amount by which the value needs to be shifted before the block is entered are determined at step 350. At step 360, these values are compared to determine if there is a mismatch between the last shifted amount of any one block and the required initial shifted amount in any of its successors. If there is a mismatch, shifts are inserted to make up for the mismatch at step 370. Shifts may be inserted at the ends of basic blocks are along block edges as needed. Once shifts are inserted or if there is not mismatch at step 360, the process ends at step 380.

Thus, according to exemplary embodiments, in addition to inserting shifts within blocks, shifts may be inserted on basic block edges. This allows the earliest point (in the whole program) in which shifts should be inserted to be identified to satisfy the initial required shift requirements for each block.

As part of this technique, an expression E may be defined as an expression on which a simple, invertible arithmetic operation is performed as part of an address computation. Such an expression may include a simple variable and a typical arithmetic operation, e.g., a multiplication or a left shift by a constant, to scale a value in a variable.

Next, a set of such expressions E={L1, E2, . . . En} may be identified by iterating over all of the code, e.g., the intermediate language (IL) instructions and decomposing addressing expressions (usually array indexing expressions) into expressions of interest with shifts. While shifts are used herein to describe the technique, any simple, invertible arithmetic operator may be used. If the set E is empty, there is no need to apply the technique.

Other uses and manipulations of each of the expressions in E are also identified. According to an exemplary embodiment, there are three cases, referred to as USE(Ei, shift-amount), INIT(Ei), and INCR(Ei, incr_amount). These are explained below.

A USE(Ei, shift_amount) expression is an expression Ei shifted by some value (shift_amount) and then used for some other purpose. Ei shifts by 0 for the case where the actual value is required and (S!=0) when the expression forms part of an index address computation.

An INIT(Ei) expression is an expression Ei that is set to a new value. When Ei is a simple variable v, this represents an assignment to v.

An INCR(Ei, incr_amount) refers to an expression Ei that is incremented. When Ei is a simple variable v, this represents an increment of v. Note that the increment amount need not be a constant. It is required that the expression by which Ei is increment is constant in the scope of the INCR(Ei,incr_amount) statement. For example, if v is updated by a variable i every time a loop is executed and the value of I does not change within the loop, the update of v may be considered INCR(v,incr_amount) and not the less precise INIT(v).

For each basic block Bx and each member Ei of E, there is a set BxEi of USEs, INITs and INCRs of (interspersed with other computations not related to) Ei. For each basic block, this set is computed by iteration of the code (e.g., IL) associated with the block. For each Ei, the required initial shift for Ei in block Bx may be defined as follows.

BxEi does not contain any USEs, and the required shift amount is $\perp$ which informally means that there is no preference. If the first non-INCR element of BxEi is an INIT, the required shift amount is also $\perp$. This informally means that if the first real operation on an expression is to assign it a new value, there is no preference for its initial shift value. Otherwise, the first non-INCR element of BxEi is USE(Ei, sa) and the required initial shift is sa.

The shift amount may also be defined as $\top$, which informally means that no single shift amount is acceptable. In a similar, symmetric way, final shift for Ei may be defined in block Bx. The technique is meaningful if and only if there exists an i such that on some execution path we find a USE(Ei, s1) followed by a USE(Ei ,s2) where s1 !=s2 (and usually one of s1, s2==0) and where there is no INIT(Ei) between the two USEs. In principle, these USEs could be in different basic blocks. An obvious extension to simple DEF-USE chains (DEF-USE-USE-USE chains) could be used to detect cases where the USEs are in different basic blocks. However, according to an exemplary embodiment, for the sake of simplicity, a search is made only for appropriate sequences of USEs within a single basic block. If required sequences of USEs are not discovered, the technique may be abandoned.

According to an exemplary embodiment, the value of an expression Ei will be in some machine register, and that register shifts appropriately between USEs.

The next step is to perform a backwards data flow analysis to discover where to move actual shifts to accommodate required shifts. For the purpose of this data flow pass, the operator l $\top$ r may be defined as follows.

l and r are shift amounts. That is, they are elements of $\{\perp,$ integer shift amounts, $\top\}$. If either l or r is $\perp$, l $\odot$ r is the other operand (i.e., the one that !=$\perp$) (Note that if l==r==$\perp$, the result is also ⊥). Otherwise, if either l or r is ⊤, l ⊙ r is ⊤. Alternatively, if l !=r, l ⊙ r is ⊤. Otherwise, l ⊙ r is l (which ==r).

According to an exemplary embodiment, the OUT (and IN) set for block Bx contains a required shift OUTi for each Ei. The value for OUTi may be computed for block Bx by performing the ⊙ operator successively over each of the corresponding values of the IN sets of each of the successors of block Bx.

The INi value may be computed for block Bx as follows: If BxEi contains no USEs or INITs, INi is set to OUTi. Otherwise, INi may be set to the required initial shift of Ei in Bx.

These data flow equations have all of the required mathematical properties, so a standard backwards data flow pass will converge.

The final step in the process is to insert appropriate shifts of each Ei. At every given program point, each Ei will be in a specific shift setting (Of course, the shift setting is only meaningful if there is an execution path from the program point to a USE(Ei, . . . ). In other cases, the shift setting of Ei is meaningless.) Shifts of elements of E may be inserted as follows:

In each block Bx, if the final value of OUTi is neither ⊥ nor ⊤, code may be inserted to adjust the shift setting of Ei from its final value in Bx to OUTi. This case represents the situation where all successor basic blocks have the same required initial shift settings for Ei. The shift adjustment may be inserted after the last USE, INIT or INCR of Ei in Bx.

In each block Bx, if the OUTi of any predecessor By of Bx does not equal the required initial shift of Ei in Bx, and the final shift of Ei in By does not equal the required initial shift of Ei in Bx, then a new block Bz may be created. The successor edge from By to Bx may be replaced by an edge from By to Bz. Similarly, the predecessor edge from Bx to By may be replaced with an edge from Bx to Bz. Finally, the appropriate predecessor and successor edges may be added to the new block Bz. In this new block, code may be inserted to shift Ei appropriately.

According to an exemplary embodiment, no matter how the block Bx is entered, the shift setting for Ei will correspond to the required initial value. Shift instructions may be added within blocks between INIT(Ei) and USE(Ei, s) where s !=0 and also between USE(Ei, s1) and USE(Ei, s2) where s1!=s2

For safety, if INi for block Bx is ⊤, the required initial shift of Ei may be zero.

If the shift setting of Ei for the USE(es) preceding an INCR are the same as for the first USE(es) after the INCR, and that shift setting is not zero, the increment of Ei may be done by first shifting the amount to be incremented appropriately. This may be applicable, for example if the value of the variable v is shifted left by two and used in an index expression, the variable v is incremented by one, and the value of the variable v is again shifted left by two and used in an index expression.

The increment may then be performed using four instead of one. Again, the idea is that v is likely to be in a register at this point and there will be a subsequent point at which code will be inserted to shift that register back to the right by two bits for use in a USE(Ei,0).

There may be potential imperfections in the scheme. One such case is the case where each predecessor of a block would have left an expression un-shifted except that the required initial shift for the block was shifted and there were sufficient instructions between the start of the block and the use of the expression to perform the shift in the block itself. To cure this, starting with the highest (execution) frequency blocks, a search may be made for cases where shifts may have been inserted in, e.g., multiple, predecessors that could better be done in the single successor.

Finally, it is the set E that is made available to the register allocator. Where possible, all related uses of USE(Ei,shift amount) are assigned to the same machine register.

Sample applications of the technique described above are expressed below in IBM's zSeries instructions. It may be common to have a series of arithmetic instructions wrapped by a right shift and a left shift. Consider a hot loop in the compress benchmark transformed by anti-striding:

```
SLL     R4,2
TopOfLoop:
        AHI     R7,1            (instruction not dependent on R4)
        ST      R7,20(,R5)      (instruction not dependent on R4)
        LR      R6,R3
        SLL     R6,16
        SRL     R4,2            (start of arithmetic sequence using R4)
        AR      R6,R4
        SLL     R3,8
        SR      R3,R4
        CHI     R4,69001
        BH      <out>
        SLL     R4,2            (end of arithmetic sequence using R4)
        L       R8,32(,R4)
        ST      R8,0(,R9)
        CR      R8,R6
BNE     TopOfLoop
```

There has been no improvement in the AGI delay because the last arithmetic expression is right before the memory reference. Multiplying the constant value in the comparison by 4 and modifying the branch target appropriately lets the shift instruction move up two instructions. In addition, instructions not dependent on R4 move down after the arithmetic sequence to reduce the AGI, resulting in:

```
SLL     R4,2
TopOfLoop:
        LR      R6,R3
        SLL     R6,16
        SRL     R4,2            (start of arithmetic sequence using R4)
        AR      R6,R4
        SLL     R3,8
        SR      R3,R4
        SLL     R4,2            (end of arithmetic sequence using R4)
        AHI     R7,1            (instruction not dependent on R4)
        ST      R7,20(,R5)      (instruction not dependent on R4)
        CHI     R4,69001*4
        BH      <out>
        L       R8,32(,R4)
        ST      R8,0(,R9)
        CR      R8,R6
BNE     TopOfLoop
```

Applying Anti-Striding Returning to the first example:

```
TopOfLoop:
        L       R4,20(R2*3,R3)
        AR      R5,R4
        L       R6,40(R2*3,R3)
        AR      R5,R6
        MR      R5,R4
        AR      R5,R2
        AHI     R2,1
        CL      R2,40(,R6)
        BLR     TopOfLoop
``` can be converted to:

```
                SLL    R2,3  (inserted for correctness)
TopOfLoop:
                L      R4,20(R2,R3)
                AR     R5,R4
                L      R6,40(R2,R3)
                SRL    R2,3  (inserted first)
                AR     R5,R6
                MR     R5,R4
                AR     R5,R2
                AHI    R2,1
                CL     R2,40(,R6)
                SLL    R2,3  (inserted last)
                BLR    TopOfLoop
```

This is better than the original code, as the shift has been moved back slightly. However, there will still be an AGI from the SLL at the loop bottom to the top of the loop. If another temporary register is added at the bottom of loop check, AGI delays may be reduced even further:

```
                SLL    R2,3
TopOfLoop:
                L      R4,20(R2,R3)
                AR     R5,R4
                L      R6,40(R2,R3)
                SRL    R2,3
                AR     R5,R6
                MR     R5,R4
                AR     R5,R2
                AHI    R2,1
                SLL    R1,R2,3
                CL     R1,40(,R6)
                BLR    TopOfLoop
```

Similarly, the zSeries instructions in the second example above may be converted from:

```
TopOfLoop:
         L      R4,20(R1*3,R3)
         AR     R5,R4
         L      R1,40(R1*3,R3)
         AR     R5,R1
         MR     R5,R4
         A      R5,120(R1,R3)
         AHI    R1,1
         CL     R1,40(,R6)
         BLR    TopOfLoop:
To:
         SLL    R1,3
TopOfLoop:
         L      R4,20(R1,R3)
         AR     R5,R4
         L      R1,40(R1,R3)
         SRL    R1,3   (add shift before arithmetic first)
         AR     R5,R1
         MR     R5,R4
         A      R5,120(R1,R3) (no shift added - subsequent arithmetic has
same stride (1) for use)
         AHI    R1,1
         CL     R1,40(,R6)
         SLL    R1,3   (add shift after arithmetic third)
         BLR    TopOfLoop:
```

Here is a high-frequency loop in the Java specjvm98 compress benchmark:

```
TopOfLoop:
         LHI    Rx,-1
         SLL    Ri,Rv,2
         ST     Rx,16(Ri,Ry)
         AHI    Rv,1
         L      Rz,20(,Ra)
         CR     Rv,Rz
         BH     TopOfLoop
```

Removing the initial shift before the memory reference and changing memory references to strided variable references:

```
TopOfLoop:
         LHI    Rx,-1
         ST     Rx,16(Rv*4,Ry)
         AHI    Rv,1
         L      Rz,20(,Ra)
         CR     Rv,Rz
         BH     TopOfLoop
```

Shifts may be introduced before the arithmetic operation, then after the memory reference (which is not required), then after the arithmetic operation, resulting in:

```
         SLL    Rv,2      (inserted for correctness)
TopOfLoop:
         LHI    Rx,-1
         ST     Rx,16(Rv,Ry)
         SRL    Rv,2      (inserted last)
         AHI    Rv,1
         L      Rz,20(,Ra)
         CR     Rv,Rz
         SLL    Rv,2      (inserted first)
         BNH    TopOfLoop
```

This code has moved the memory reference shift back 2 instructions, behind the LHI and BNH instructions, decreasing the AGI, and inserted a new instruction after the memory reference store.

On IBM's z990 system, an iteration of the loop has gone from a 3 cycle AGI with 4 cycles for execution of the remaining instructions to a 2 cycle AGI with 4 cycles for execution of the remaining instructions, using one less register.

The Add/Compare/Branch sequence at the bottom of a loop is not optimal. The more general problem this highlights is if a shift has been introduced on both sides of an arithmetic sequence on one or more expressions involving 'v' (as in the example above), the final shift can possibly be removed if a temporary variable is introduced for the sequence, e.g.,

```
         SLL    Rv,2      (inserted for correctness)
TopOfLoop:
         LHI    Rx,-1
         ST     Rx,16(Rv,Ry)
         AHI    Rv,4      (change increment to that of the stride)
         SRL    Rt,Rv,2   (inserted last)
         L      Rz,20(,Ra)
         CR     Rt,Rz
         BNH    TopOfLoop
```

This runs much better than the previous examples. The last update to Rv is on the AHI instruction. This is 3 cycles before the memory reference and so will only cause a 1 cycle AGI. The execution time is 4 cycles with a 1 cycle AGI. This last optimization needs more consideration. It may make desirable to incorporate it into general loop striding for zSeries, or at a minimum, a basic pattern matching simplification for zSeries to reduce AGI's at loop back-edges. It also probably overlaps code to recognize and generate BCT loops for zSeries.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method executed by a central processing unit (CPU) for reducing delays during compiler optimization, comprising:
    scanning blocks of code in order from blocks recurring most often to blocks recurring least often;
    in the order of blocks recurring most often to blocks recurring least often, inserting shifts before arithmetic references, such that a previous use of the arithmetic reference does not require a shift;
    in the order of blocks recurring most often to blocks recurring least often, inserting shifts after each memory use, such that a next use of the memory does not require a shift; and
    in the order of blocks recurring most often to blocks recurring least often, inserting shifts after each arithmetic reference, such that the next use requires no shift.

2. The method of claim 1, wherein shifts are inserted after each arithmetic reference except the last one in the block.

3. The method of claim 1, further comprising:
    determining a required shift amount for the first use of each arithmetic expression in each block;
    for each expression and each block, determining the last shifted amount of each block and the amount of shift needed before a block is entered; and
    comparing the last shifted amount of each block with the amount of shift needed before a successive block is entered to determine if there is a mismatch between the last shifted amount of any one block and the required initial shifted amount in any of its successors.

4. The method of claim 3, wherein if there is a mismatch between the last shifted amount of any one block and the required initial shifted amount in any of its successors, the method further comprises inserting shifts to make up for the mismatch.

5. The method of claim 4, wherein the shifts are inserted at the ends of basic blocks.

6. The method of claim 5, wherein the shifts are inserted along edges between blocks.

7. The method of claim 6, wherein the step of inserting shifts along edges between blocks comprises:
    identifying a set of expressions within the code, each expression including a simple, invertible arithmetic operation that is performed as part of an address computation;
    performing a backwards data flow analysis through the code to determine where to move actual shifts to accommodate required shifts; and
    inserting appropriate shifts in each expression to accommodate required shifts.

8. A computer program product for reducing delays in code optimization,
    comprising a non-transitory tangible computer usable medium having a computer readable program, wherein the computer readable medium when executed on a computer, causes the computer to:
    scan blocks of code in order from blocks recurring most often to blocks recurring least often;
    in order from blocks recurring most often to blocks recurring least often, insert shifts before arithmetic references, such that a previous use of the arithmetic reference does not require a shift;
    in order from blocks recurring most often to blocks recurring least often, insert shifts after each memory use, such that a next use of the memory does not require a shift; and
    in order from blocks recurring most often to blocks recurring least often, insert shifts after each arithmetic reference, such that the next use requires no shift.

9. The computer program product of claim 8, wherein shifts are inserted after each arithmetic reference except the last one in the block.

10. The computer program product of claim 8, wherein the computer readable medium causes the computer to:
    determine a required shift amount for the first use of each arithmetic expression in each block;
    for each expression and each block, determine the last shifted amount of each block and the amount of shift needed before a block is entered; and
    compare the last shifted amount of each block with the amount of shift needed before a successive block is entered to determine if there is a mismatch between the last shifted amount of any one block and the required initial shifted amount in any of its successors.

11. The computer program product of claim 10, wherein if there is a mismatch between the last shifted amount of any one block and the required initial shifted amount in any of its successors, the computer readable medium causes the computer to insert shifts to make up for the mismatch.

12. The computer program product of claim 11, wherein the shifts are inserted at the ends of basic blocks.

13. The computer program product of claim 11 wherein the shifts are inserted along edges between blocks.

14. The compute program product of claim 13, wherein computer readable medium causes the computer to insert shifts along edges between blocks by causing the computer to:
identify a set of expressions within the code, each expression including a simple, invertible arithmetic operation that is performed as part of an address computation;
perform a backwards data flow analysis through the code to determine where to move actual shifts to accommodate required shifts; and
insert appropriate shifts in each expression to accommodate required shifts.

15. An optimization compiler comprising:
an input for receiving code; and
a hardware processor for scanning blocks of code in order from blocks recurring most often to blocks recurring least often, wherein, in an order from blocks recurring most often to blocks recurring least often, the processor inserts shifts before arithmetic references, such that a previous use of the arithmetic reference does not require a shift, inserts shifts after each memory use, such that a next use of the memory does not require a shift, and inserts shifts after each arithmetic reference, such that the next use requires no shift.

16. The compiler of claim 15, wherein the processor:
determines a required shift amount for the first use of each arithmetic expression in each block;
for each expression and each block, determines the last shifted amount of each block and the amount of shift needed before a block is entered; and
compares the last shifted amount of each block with the amount of shift needed before a successive block is entered to determine if there is a mismatch between the last shifted amount of any one block and the required initial shifted amount in any of its successors.

17. The complier of claim 16, wherein if there is a mismatch between the last shifted amount of any one block and the required initial shifted amount in any of its successors, the processor inserts shifts to make up for the mismatch.

18. The complier of claim 17, wherein the shifts are inserted at the ends of basic blocks.

19. The compiler of claim 17, wherein the shifts are inserted along edges between blocks.

20. The compiler of claim 19, wherein the processor inserts shifts along edges between blocks by identifying a set of expressions within the code, each expression including a simple, invertible arithmetic operation that is performed as part of an address computation, performing a backwards data flow analysis through the code to determine where to move actual shifts to accommodate required shifts, and inserting appropriate shifts in each expression to accommodate required shifts.

* * * * *